March 21, 1967 L. P. LEALE Re. 26,174

HEARING AID

Original Filed Dec. 5, 1961 3 Sheets-Sheet 1

INVENTOR.
Leslie P. Leale
BY
Morrison, Smith & Marshall
Attorneys

INVENTOR.
Leslie P. Leale
BY
Merriam, Smith & Marshall
Attorneys

HEARING AID
Original Filed Dec. 5, 1961 3 Sheets-Sheet 3
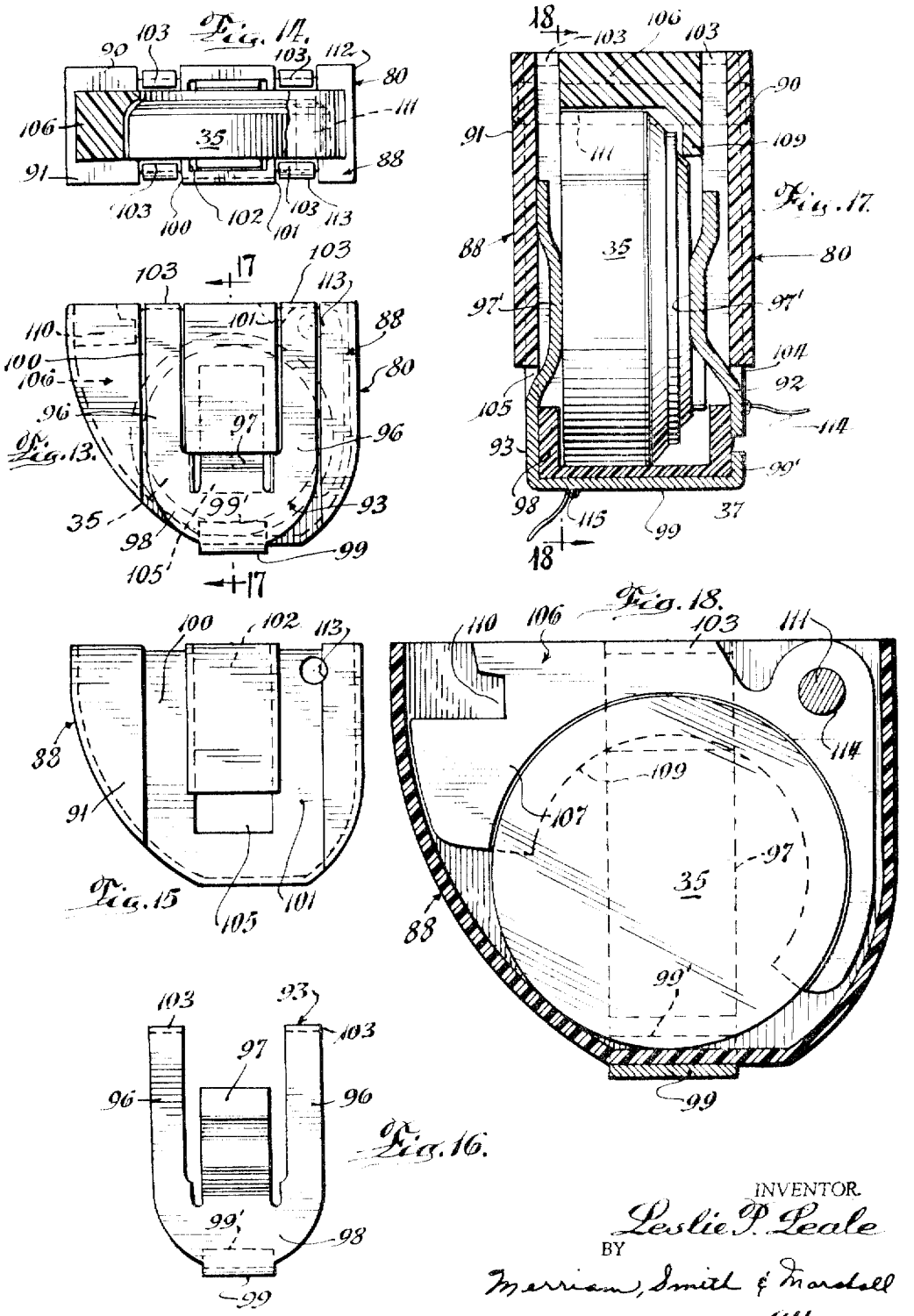
INVENTOR.
Leslie P. Leale
BY
Merriam, Smith & Marshall
Attorneys United States Patent Office Re. 26,174
Reissued Mar. 21, 1967

26,174
HEARING AID

Leslie P. Leale, San Mateo, Calif., assignor to Earmaster, Inc., Burlingame, Calif., a corporation of California Original No. 3,170,046, dated Feb. 16, 1965, Ser. No. 157,144, Dec. 5, 1961. Application for reissue Jan. 14, 1966, Ser. No. 526,942
12 Claims. (Cl. 179—107)

Matter enclosed in heavy brackets [ ] appears in the original patent but forms no part of this reissue specification; matter printed in italics indicates the additions made by reissue.

This invention relates to electronic devices for aiding persons having hearing deficiencies to hear. It is more particularly concerned with a self-contained electronic amplifier system to relieve deafness which is held within the auricle or outer ear.

Hearing aids employing electronic amplifier systems have long been available for assisting deaf persons to hear. The first devices were cumbersome and required relatively large housings for the component parts of the amplifier system. The development of miniaturized electronic components permitted smaller, self-contained hearing aids to be manufactured which could be less conspicuously worn by the deaf person. Various approaches have been made to house the amplifier components for self-contained hearing aids, which function as a corrective link for receiving sound, amplifying, and transmitting it to the auditory nerves, in oversized bows of eyeglasses, housings designed to be placed behind the outer ear, as well as housings for so-called in-the-ear hearing aids which fit within the outer ear.

The later type of housing wherein the hearing aid fits within the outer ear and a portion of the auditory canal is desirable because it is inconspicuous, provides ear level hearing by providing a corrective and amplifying link between the eardrum and external ear, does not have to be removed in order to clean one's eyeglasses (as in the case where the eyeglass bow is used as the housing), eliminates the need for external wires or sound tubing for connecting components, and is more attractive. The manufacture of such housings, however, is more difficult because the housing is preferably custom-made by taking an impression of a portion of the outer ear and external auditory canal of the person being fitted, and using the impression as a mold for forming the housing shell. Although a number of molding techniques and various materials of construction have been used to form the housing, the production of a structurally acceptable shell housing has been a problem in the manufacture of in-the-ear hearing aids.

According to this invention, however, there is provided, for use in the production of in-the-ear hearing aids, inter alia, an electroformed metal housing which can house, in a self-contained unit, the miniaturized components of the hearing aid amplifier, yet be inconspicuously and comfortably worn. Sufficient and uniform wall thickness is provided in the housing to provide structural strength without sacrificing internal capacity required to house the component parts. Mold forming technique and control in the metal laydown during the electroforming process permit the manufacture of a housing having auditory canal extension which fits snugly within the canal to provide not only an effective seal to facilitate the transmission of sound within the auditory canal by air conduction but also to provide a degree of sound transmission by bone conduction by means of an effective contact made by the canal extension with the ear bones adjacent the auditory canal thereby improving the sound transmission characteristics of the hearing aid. The compactness of the housing permits the entire hearing aid unit to be placed within the ear such that the center of gravity of the unit is well within the confines of the outer ear thereby facilitating the wearing of the device.

Referring to the drawings:

FIGURE 13 is a side elevation view of the illustrative battery compartment which is mounted within the unit housing employing the technique shown in FIGURES 9–12;

FIGURE 14 is a plan view of the battery compartment of FIGURE 13 showing a fragmentary cross-sectional view of the top portion of the pivotally mounted battery compartment;

FIGURE 15 is a side elevation view of the battery compartment of FIGURES 13 and 14 without the battery holder and electrical contacts mounted thereon;

FIGURE 16 is an illustration of an electrical contact for use in the battery compartment of FIGURES 13 and 14;

FIGURE 17 is an enlarged cross-sectional view of the battery compartment shown in FIGURES 13 and 14 taken along line 17—17 of FIGURE 13; and FIGURE 18 is a cross-sectional view of the battery compartment of FIGURES 13 and 14 taken along line 18—18 of FIGURE 17.

Figure 1:
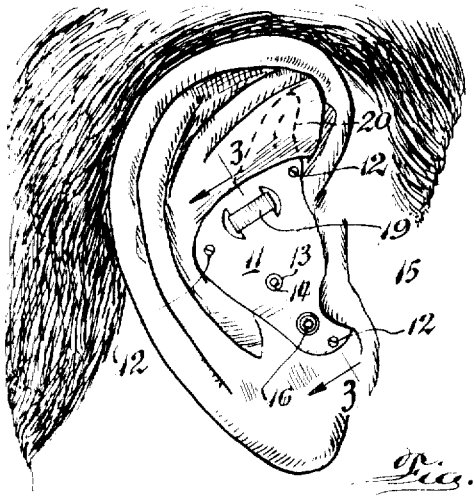
FIGURE 1 is a diagrammatic side view of an in-the-ear hearing aid showing an illustrative embodiment of the housing of this invention placed within the ear.
Figure 2:
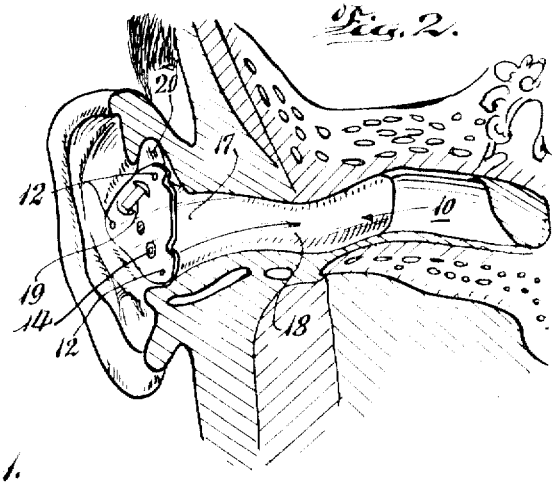
FIGURE 2 is a cutaway view of an illustrative housing showing the use of an antihelix finger for retaining the housing in position in the ear, which is shown in section.

Referring to the drawings, the illustrative specific embodiment of this invention as shown in FIGURES 1 and 2 comprises a metallic housing 10 enclosed by a removable cover plate 11 held in place by threaded fasteners 12 which engage with threaded apertures provided in the side wall of housing 10. An opening 13 which receives the sound inlet 14 of a conventional microphone pickup positioned within the housing 10 is provided in cover plate 11, as well as an access hole 15 to permit the adjustment of the volume control element of the amplifier network (not shown) by means of a suitable tool which permits the positioning of the volume control rotor 16. The housing 10 consists of the main body 17 in which the amplifier network components (not shown) are positioned, and the sound conduit extension 18 which snugly fits into the auditory canal and directs the sound picked up by microphone 14 and subsequently amplified and transmitted to the ear drum.

The amplifier network, which provides a corrective and amplifying link between the outer ear and the ear drum, is contained within the housing and in this embodiment includes a battery source of power removably held in a suitable battery compartment 19 which will hereinafter be described, and a receiver (not shown) which transmits the amplified sound through a suitable sound conduction medium. A variety of sound transmission means can be employed in order to effect the direction of the amplified sound into the auditory canal, which will hereinafter be discussed.

The housing 10 which, in accordance with this invention, is custom molded from a suitable metallic material of construction and fitted to duplicate the configuration of the concha portion of the outer ear and at least a portion of the auditory canal, is held in place within the outer ear by means of a projecting finger 17, laterally depending from the housing 10, which engages the hollow in the exterior ear, formed by the upper portion of the antihelix and the concha. The housing 10, being molded to fit within the concha, is also held in place by the tragus and the antitragus elements of the ear. The configuration of housing 10 and its cooperating cover plate 11 are such that the center of gravity of the hearing aid employing the instant invention is positioned well within the concha, thereby facilitating the frictional retention of the hearing aid of this invention within the external ear once it is positioned.

In order to form the housing 10 of the hearing aid of this invention, a make impression is formed to duplicate the ear configuration of the person whose hearing loss is to be corrected. Suitable impression materials which can be used are room temperature, vulcanizable, synthetic, silicone elastomers such as those sold by Dow Corning under the trademark "Silastic," or other conventional impression materials.

The make impression is then invested using a conventional dental stone or other conventional molding composition to form a female investment mold, with care being taken to repair any defects noted upon removal of the make impression. A low melting metal alloy such as Mellott's metal or other alloys preferably melting within the range of about 180°–250° F. is poured into the female investment to form a male metal mold. The female investment mold is broken away and the male mold recovered. The faces of the male mold are scored with a plurality of cuts about .010"–.030" deep, preferably about .014", after which the surface is polished and buffed to remove the score marks and form the finished electroforming mold. The score marks or other similar gauge marks are employed to lower the face of the mold to compensate for the thickness of electroplated metal laid down on the male mold in forming the housing. The mold is placed in a suitable high throwing power electrolyte, preferably a copper or nickel. In order to provide the proper "throwing power" and insure a uniform thickness, plating anodes are positioned in the electrolyte about the mold, around and especially near all the deep undercuts where necessary. For example, in the undercut which forms the depending finger 17 which engages the hollow formed by the concha and antihelix, a thin wire anode is placed. The cathodic mold is held in the electrolyte bath preferably with the sound conduit extension directed toward the main anode. If desired, more than one mold can be electroformed at the same time. Because of the various factors influencing the metal laydown such as time of plating, surface area of the mold and others, the desired current density should be determined experimentally. In one plating operation satisfactory electroformed drawings .014" thick have been produced using a current density of 0.4 milliampere per mold for 15 hours. Other current densities and plating times however can be used.

Satisfactory housings can be produced by forming a substantially uniform metallic coating between about .010" and .030" thick. In one commercial embodiment of the instant invention, a housing .014" thick had adequate structural strength and a sufficient capacity within the hollow housing to incorporate therein the various components of the electronic amplifier network and still provide a hearing aid device which fits well within the external ear of the wearer with substantially all of the housing being positioned within the concha and auditory canal. The preferred material of construction which is used in forming the housing base is copper. However, other metallic materials of construction which can be electroformed, such as nickel, etc., can also be employed. The electroformed metallic housing is thereafter preferably skin electrocoated, preferably with a noble metal such as gold, in order to resist corrosion and enhance the cosmetic effect of the instrument using conventional plating techniques. If desired, a nickel undercoat can be used prior to the gold plating. After the plating has been completed the male mold is then removed by the application of heat such as by immersion in hot oil maintained at a temperature above the melting point of the low melting alloy used to form the male mold. If desired, a flesh-like effect can be obtained by coating the housing base with a protective coating such as epoxy resin, or urethane paint which has been colored or pigmented to match the complexion of the hearing aid wearer. After the housing 10 has been coated with the selected protective coating, if this step is used, the formed housing provides a substantially hollow ear mold in which the components of the electronic amplifier circuit can be positioned. As hereinbefore mentioned, the availability of miniaturized electronic components as well as transistors permits the assembly of an electronic amplifier network which can be fitted within the confines of housing 10 and enclosed by a suitable cover plate 11.

Although the mold employed in the above described electroforming process was formed from a male mold fashioned from an electrically conductive material, female forming molds as well as non-conductive materials can be used providing the surface can be worked to compensate for the housing thickness which is taken care of by the scoring technique outlined above. The surface of the non-conductive material is made conductive by the application of a graphite coating, or other suitable surface treatment techniques which make the surface of the mold electrically conductive.

In order to carry the amplified sound from the receiver positioned in the housing 10 to within the auditory canal, a number of expedients can be employed. Generally, in a hearing aid of the type embodied in this invention the amplified sound is transmitted from the receiver to some means for inducing sound vibrations in the air within the auditory canal so that the vibrations can be received by the inner ear or ear drum. In addition, however, in the hearing aid of this invention because of the characteristics of the electroformed metallic housing vibrations occur in the housing such that a degree of sound transmission by bone conduction is also experienced when the auditory canal extension portion resides in the canal adjacent to and in contact with the bone structure surrounding the auditory canal. The transmission of sound from the receiver by air conduction is generally effected by a short piece of sound tubing connecting the receiver with the terminal end of the housing located in the auditory canal in the event that the receiver cannot be placed adjacent to the terminal end of the housing.

Figure 3:
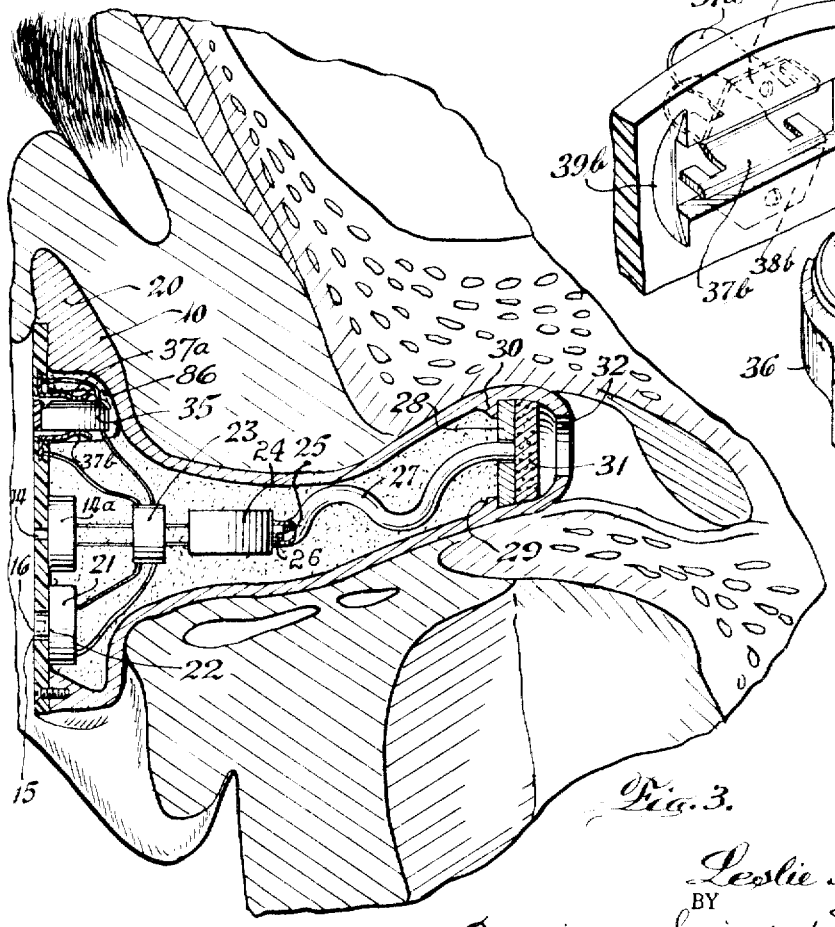
FIGURE 3 is an enlarged cross-sectional view of an in-the-ear hearing aid placed within the ear and illustrating a sound conduit construction which provides minimum feedback.

Referring to FIGURE 3, there is shown an embodiment of the instant invention which uses sound tubing and which has a number of construction features. In this enlarged drawing, the main body 17 of the metallic, electroformed housing 10 is shown positioned in the concha and the auditory canal exetnsion 18. For practical purposes the arrangement of the amplifier network components are shown schematically. The amplifier network comprises (a) microphone 14a, (b) volume control 21 having a suitable manual control 16 which is adjusted by means of access hole 15 located in the cover plate, (c) an amplifier circuit 23, shown in block form, provided with sufficient stages, preferably three, to amplify the sound picked up by microphone 14a, (d) a receiver 24, and (e) a source of power such as battery 35. It is to be noted that the planes in which the microphone 14*a* and receiver 24 are placed are angularly displaced 90° with respect to each other. The receiver 24, instead of having a sound outlet on its face, has a side opening for the sound tube 27 connection. With this arrangement of components, feedback in the instrument is substantially eliminated. The cover plate 11, which in this example is fashioned from an electrically non-conductive material such as a suitable plastic, encloses the housing.

In order to improve the acoustical effects produced by the hearing aid device of the instant invention, it is preferred that after the components have been mounted within the housing, the interior of the case be filled with a sound-absorbent elastomeric material, preferably natural rubber. The microphone 14a is mounted on the cover plate and held in place by a suitable metal-to-rubber adhesive which permits the sealing of the sound-receiving tube 14 of the conventional microphone to the wall of the aperture provided in cover plate 11. Flexible electrical leads are used to connect the microphone to the other components of the amplifier network. In order to further improve the sensitivity of the hearing aid device of this invention, it is preferred that the housing of the microphone be coated with a thin coating of a sound-absorbent material such as latex rubber. The microphone 14a is positioned within the housing and held in place by the elastomeric material.

The electrical output from the amplifier circuit 23 is sent to the receiver 24 which is located in the housing 10 as close to the terminal and of the housing as is practical. Various types of conventional receivers can be employed so long as the desired sensitivity and wide frequency range is available. The amplified sound is emitted from the receiver 24 through a suitable opening 25 to which is fitted a stub flange 26. To the stub flange 26 is attached one end of a short piece of sound tubing 27. The other end of the sound tubing is held in place and axially aligned within the terminal end of the extension 18 by means of a suitable spacer 28. Spacer 28 is positioned within extension 18 by means of an inwardly directed flange 29 upon which the spacer 28 rests.

For sanitary purposes and to prevent the clogging of the sound tubing 27 with ear wax or the like, a porous filter 31 is used. Filter 31 is inserted through the opening 32 provided in the terminal end of housing 10 through which the sound is emitted for transmission to the inner ear. Filter 31 is preferably made of a foamed plastic such as polystyrene, polyurethane, polyethylene, and the like, having continuous porosity and a permeability such as not to impede the transmission of sound therethrough. Filter 31 is replaceable and can be readily removed by a tweezer or sharp pointed instrument which can be used to pluck the filter 31 from within the terminal end of the housing 10 through the opening 32.

The conventional sound tubing 27 is made of a suitable material, preferably sound-proof, which can be used to lead the high pressure sound emitted by reicever 24. While the substantial elimination of feedback can be effected by the relative positioning of the microphone 14a and receiver 24 as above noted, the elimination of feedback can be further improved by providing a tortuous path for the sound tubing 27 between the respective connections at receiver 24 and spacer 28 as shown in FIGURE 3. This expedient can be employed when the opening through the auditory canal of the wearer is not abnormally contracted and a relatively wide cross-section can be provided in the auditory canal extension 18. The sound tubing 27 is preferably made of a thin-walled natural rubber tubing having an internal diameter of about .016″. Other materials such as polyethylene, vinyl, etc., can be used to manufacture suitable sound tubing. It is preferred, however, that the material is selected to be sound-proof, soft, and leak-proof, as well as resistant to distortion upon aging.

Figure 4:
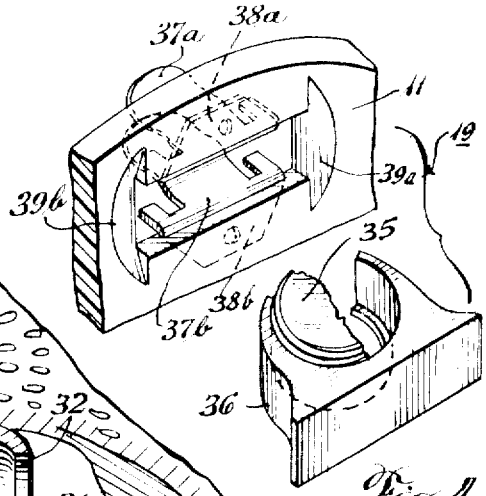
FIGURE 4 is an enlarged, exploded view of the illustrative battery compartment employed in the hearing aid shown in FIGURES 1–3.

In the example of FIGURE 3 the battery 35 is removably positioned in a removable battery carrier 36. As shown in FIGURE 4, suitable spaced, resilient electrical contacts 37a and 37b are held spaced apart on opposite sides of the access hole by ears 38a and 38b which are cast in place in the cover plate 11. The spaced contacts 37a and 37b cooperate to hold the battery 35 and battery carrier 36 in place by frictional engagement. Recesses 39a and 39b are provided to permit the ends of the cover element of the battery carrier 36 to be gripped in order to facilitate its removal.

Figure 6:
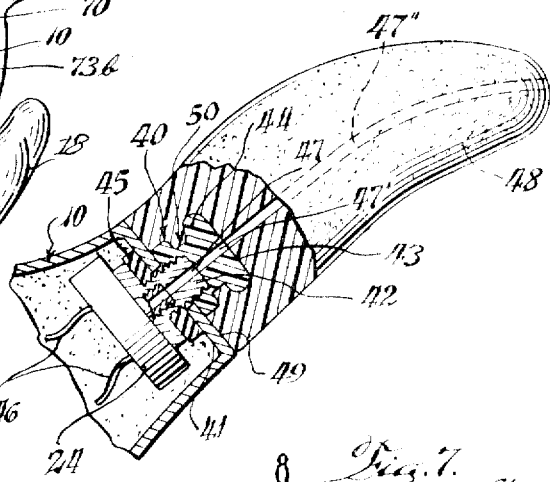
FIGURE 6 is a fragmentary view of an alternative auditory canal tip construction.
Figure 8:
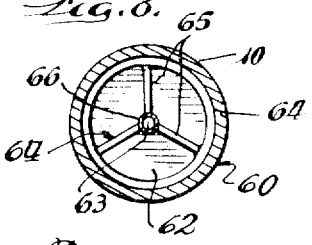
FIGURE 8 is a cross-sectional view of FIGURE 6 taken along line 6—6.
Figure 7:
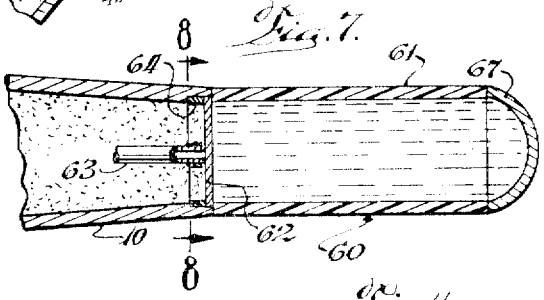
FIGURE 7 is a fragmentary view of another embodiment of an auditory canal tip.

Alternative embodiments for use in transmitting sound within the auditory canal to the ear drum are also shown in FIGURES 6–8. In FIGURE 6, a removable ear mold tip attached to a housing formed in accordance with this invention is shown. The ear mold tip can be hard or soft as desired by the wearer. In this instance, the extension portion 18 of housing 10, shown in fragmentary view of FIGURE 6, has mounted thereon a plug assembly 40 which is attached to an end-wall enclosing the terminal end of housing 10. The extension portion 18 of the integral housing 10 is shortened in order that the overall length of the extension portion 18 and plug member 48 will be of a desired length to permit the hearing aid to be worn comfortably. A hole centrally positioned in end-wall 41 of the housing 10 is provided to receive a threaded bushing 42. To the outer end of the bushing 42 is threadably attached a button 43 having a flanged head 44. A threaded fastener 45 cooperates with the other end of bushing 42 to hold the button 43 in place on end-wall 41. The end of the internal passageway 47 of the bushing 42 extending into the housing 10 is provided with an internally threaded portion by means of which it is threadably attached to the outlet of receiver 24. Suitable electrical leads 46 are used to connect electrically the receiver 24 with the other components of the amplifier network (not shown). The internal passageway 47 provided in bushing 42, the bore hole 47′ in button 43, as well as the bore 47″ in ear mold tip 48, are aligned with sound outlet of receiver 24.

A suitably formed ear mold tip 48 having an end-wall 49 which abuts against the end-wall 41 of housing 10 and an external cavity 50 is removably attached to the button 43 of the plug assembly 40 by engaging the external cavity 50 of ear mold 48. Preferably, the external cavity 50 has an internal configuration conforming generally to the shape of button 43.

The arrangement illustrated in FIGURE 6 is employed to eliminate the need for expensive custom-made molds and permits the use, if desired, of premolded, anatomically shaped, stock ear mold tips having varying degrees of hardness. Various sizes of left or right models can be provided in order to afford flexibility in the fitting of the hearing aids of this invention. In employing this type of construction, a housing 10 formed in accordance with this invention is provided which will fit within the concha of the external ear, and to this housing is then fitted a stock ear mold selected for closest conformation with a customer's auditory canal. Other ararngements can also be used for attaching the stock ear molds to the hearing aid housing of this invention. Also, other connections can be used for transmitting the sound from the receiver through the ear mold tip member.

Another ear mold tip feature of this invention is shown in FIGURES 7 and 8. In this illustrative embodiment, the ear mold tip 60 consists of a tubular side-wall 61 fabricated from a flexible material which permits it to conform as closely as possible with that portion of the auditory canal in which it is placed. One end of the tubular element is fitted to a stub extension portion of housing 10 by a suitable fastening arrangement such as adhesive fastening or the like. The terminal end of the housing 10 is enclosed with a flexible, thin diaphragm member 62 to which is attached sound tubing 63 leading from the sound outlet of the receiver element (not shown) of the amplifier network. The free end of the sound tubing 63 is fastened to the center of the diaphragm 62 by means of a suitable adhesive or the like, or other fastening arrangement. A spider 64 is positioned in the terminal end of housing 10 to permit the axial alignment of sound tubing 63. Spider 64 comprises three equally spaced radially extending arms 65 which are attached to a central hub 66 which is provided with an internal bore within which rests the sound tubing 63. The other end of tubular element 61 is enclosed with a flexible diaphragm 67 which is adapted to vibrate in sympathy with vibrations induced in diaphragm 62. The fluid-tight chamber thus formed by the end diaphragms 62 and 67 and tubular side-wall 61 is filled with an incompressible fluid in order to communicate the vibrational movement of diaphragm 62 to diaphragm 67, and thence through the auditory canal to the ear drum. Although the fluid within the chamber of ear mold tip 60 can be water, it is preferable that other materials which are not affected by atmospheric conditions, or other external aberrations, are employed, such as aqueous solutions of alcohol, ethylene glycol, or non-aqueous systems having the desired sound transmission characteristics.

As hereinbefore noted, the amplifier circuit can be powered by a conventional hearing aid electric battery 35 which fits within housing 10. A variety of battery holders can be employed to permit the battery to be readily removed from the housing for replacement. It is preferred that access to the battery compartment can be had from outside the housing 10 without the necessity of removing the cover plate 11 or otherwise disassembling the hearing aid. The housing 10 can be provided with suitable springed, resilient, metallic, electrical connectors which will hold the battery compartment in place upon engagement with the battery contacts as shown in the embodiment of FIGURES 1–4. Alternative arrangements can also be provided in order to faciliate the removal of the battery, as well as insure a positive positioning of the battery between the battery contacts.

Figure 5:
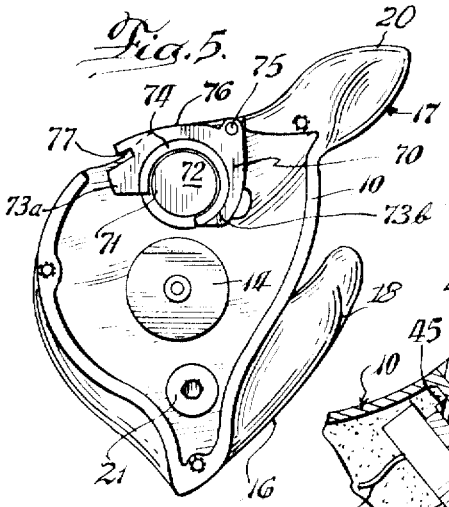
FIGURE 5 is an enlarged view of an illustrative housing with the cover plate removed and showing another type of battery compartment.

One such arrangement is shown in FIGURE 5 which illustrates an electroformed housing 10 of this invention with the cover plate removed and showing the exposed microphone and volume control 21. A battery compartment 70, which is pivotally mounted on housing 10, is shown. The battery compartment 70 has a circular recess 71 generally conforming to the configuration of battery holder 36 shown in FIGURE 4 which is shaped to conform with the configuration of a circular discoid electrical battery 72. A pair of inwardly directed arms 73a and 73b form the recess. One side of the recess is provided with an inwardly directed flange 74 upon which the battery 35 rests. A portion of the side-wall of housing 10 is cut away to permit the insertion and pivotal mounting of battery compartment 70 within housing 10. The battery compartment 70 is pivotally mounted within housing 10 by means of axle 75 which is held in place in the side-wall of housing 10. Battery compartment 70 has a cutaway portion at the end of arms 73a and 73b in order to conserve space, as well as avoid interference with other parts of the amplifier circuit located within the housing 10. The cover wall 76 of battery compartment 70 is shaped to conform generally with the outline of the side-wall of housing 10 in which the battery compartment 70 is located. A recess 77 provided in wall 76 is used to permit the battery compartment to be swung outwardly by engaging the fingertip with the battery compartment recess 77. Suitable electrical contacts (not shown) are provided in the hearing aid housing 10 which will engage with the contacts of battery 72 when the battery is inserted in the recess 71 and the battery compartment retracted into the housing 10.

Figure 9:
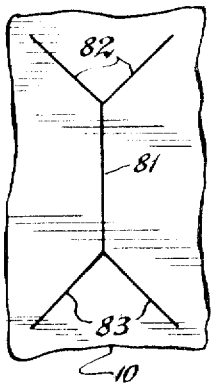
FIGURES 9–12 illustrate the technique for attaching still another alternative type of battery compartment to the unit housing.
Figure 10:
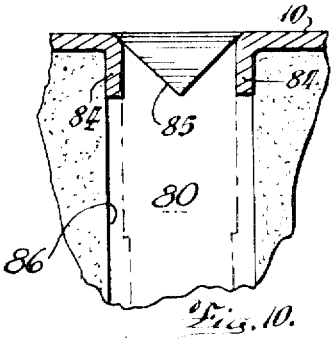
Figure 11:
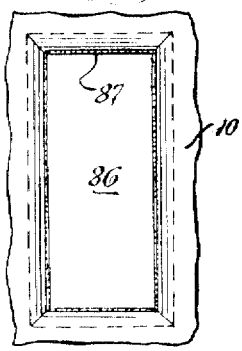
Figure 12:
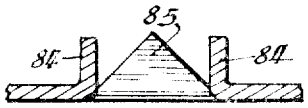

Another battery housing which can be employed in the electroformed hearing aid housing of this invention is shown in FIGURES 9–18. In this instance, the battery compartment 80 is inserted in the side-wall of housing 10 by a manufacturing process which facilitates the installation and arrangement of the electrical contacts which interconnect the battery with the other components of the amplifier network. As shown in FIGURES 9–12, the side-wall of housing 10 is initially slit, as shown in FIGURE 9, to provide a slit having an intermediate straight portion 81 and oblique end slits 82 and 83. The slit portions of the housing are then bent inwardly as shown in FIGURES 10 and 12 to form inwardly extending flanges 84 and 85. The battery compartment 80, which will hereinafter be described, is then inserted into the rectangular opening 86 formed by the flanges 84 and 85 and sealed in place by cementing the upper edge of compartment 80 to the sides of the rectangular opening 86 with a suitable cement 87. It will be noted that the upper end of the battery compartment preferably is flush with the side-wall of housing 10 as shown in FIGURE 10.

The battery compartment 80, as shown in FIGURES 13–18, comprises an exterior housing 88 which is secured in place in the side-wall of housing 10, as hereinbefore discussed. The external housing 88 has an internal cavity 89, and is also provided with an arrangement of recesses and slots in the side-walls 90 and 91 which permit the installation of electrical contacts 92 and 93 therein to insure a more positive engagement between the battery contacts and the electrical connections. The slot system is provided by cooperating recesses formed in side-walls 90 and 91. The electrical contact 93, which is shown alone in FIGURE 16 and installed in FIGURES 13, 14, 17 and 18, has a general W configuration formed by outer legs 96 and intermediate leg 97, which are interconnected and depend from flanged web 98. Electrical contact 92 is similarly shaped but does not have the L-shaped leg element 99 which is attached to the bottom of flanged web 98 of electrical contact 93 in a manner hereinafter discussed. The free ends of the outer arms 93 are provided with inwardly turned flanges 103. As shown in FIGURE 15, the side-walls 90 and 91 are each provided with two elongated external recesses 100 and 101. There is also provided in the side-wall an internal recess 102. The depth of the external and internal recesses 100, 101 and 102 is selected such that there is provided wall openings 104 and 105 adjacent the bottom of exterior housing 88 which are formed when the bottom side-wall of exterior housing 88 is recessed to a sufficient depth to provide a substantially planar surface with relation to the external recesses. This arrangement of recesses permits the insertion of the electrical contact 93 by the positioning of the intermediate leg 97 within the interior recess 102, and the outer legs 96 in recesses 100 and 101, respectively. The web member 98 rests in the recessed bottom wall portion of outer housing 88. The contact is held in place by the flanged tip 99' which engages side-wall 90 of the external housing and the flanges 103 which engage slots provided at the upper end of the external recesses 101. Similarly, contact 92 is frictionally positioned in the slot system provided in side-wall 90 and held in place by the natural bias provided by the resilient metallic material of construction such as spring brass used in fabricating battery contacts 92 and 93. The intermediate legs 97 of contacts 92 and 93 have formed thereon an intermediate bowed section 97' which is directed inwardly toward the interior of the external housing 88 such that the internal distance between the contacts is less than the thickness of the electrical battery 35 thereby insuring that the battery is held in place by the frictional engagement provided by the opposed bowed sections of intermediate legs 97.

In order to readily remove the battery 35, a battery holder 106 similar to that employed in FIGURE 5 is pivotally mounted within the recess of exterior housing 88. As seen in FIGURES 17 and 18, the battery holder comprises a C-shaped frame 107 having a recess 108 which holds 105. An inwardly directed flange 109 is used to hold the battery in position. A recessed grip 110 is used as an aid for swinging the battery holder outwardly in order to facilitate the replacement of the battery. The battery holder 106 is pivotally mounted by means of pin 111 which is journaled in bearing holes 112 and 113 provided in external housing 88 and hole 114 in battery holder 106.

In fabricating the battery compartment, any suitable material of construction can be utilized, provided a short circuiting of the battery is not produced. Although the electroformed housing 10 is formed from a suitable metal, the external housing 88 of battery compartment 80 is formed from a non-conductive material such as a polystyrene, or some other high impact plastic, in order that the electrical contacts can be positioned thereon without resulting in a short circuit. The battery holder 106 may be fabricated from metal if its configuration does not bring it into engagement with the electrical contacts. The electric leads 114 and 115 are attached respectively to electrical contacts 92 and 93 for connection with the rest of the amplifier network. In order to provide the desired frictional engagement for the battery, a spring material such as spring brass or beryllium copper having a thickness of about .010–.015" is preferred.

Although this invention has been described with reference to a number of specific illustrative embodiments, it is evident that variations and modifications can be made therein by one skilled in the art without departing from the scope of the invention. In the selection of the electronic components for use in a hearing aid amplifier network, it is preferred that magnetic microphones and high impedance magnetic receivers be employed in order to minimize feed back problems as well as provide high sensitively and wide frequency ranges. Other types of microphones and receivers, however, can be utilized if desired. The availability of other than battery forms as shown which would require a modification of the recess of the battery compartment so that the battery could be properly held.

Although the foregoing description of this invention has emphasized the use of the metallic electro-formed housing as a hearing aid component, housings of this nature can also be employed as radio receiver housings for fixed frequency receivers such as would be employed by armed forces personnel for receiving orders, instructions and the like from a remote control post. In this type of arrangement, a 3-stage amplifier could be employed and a tunnel diode or crystal pick-up substituted for the microphone employed in the hearing aid in order to receive the signal.

Other changes in the invention can also be made without departing from the teachings herein. Accordingly, the instant invention is to be limited only in the manner set forth in the appended claims.

I claim as my invention:

1. A self-contained hearing aid comprising:

a unitary, electro-formed, metallic housing having thin walls of substantially uniformed wall thickness, said unitary housing comprising a main body portion conforming substantially to the concha area of the ear and having means dependent from said main portion for frictionally engaging the hollow of the ear formed by the antihelix and concha and an auditory canal portion formed to fit snugly within the auditory canal of the ear, the outer end of the main body portion having an opening to provide access to the interior of the housing;

a coverplate removably attached to said housing totally enclosing said housing, said plate having a slot located therein;

a pair of opposed resilient metal electrical contacts mounted on said cover in spaced relationship on the opposite sides of said slot;

a removable battery carrier fitted within said slot, said carrier having a recess therein for holding an electrical battery;

a microphone attached to said coverplate;

an amplifier circuit directly connected to said microphone; and a receiver connected only to said amplifier circuit and to said microphone.

2. A self-contained hearing aid according to claim 1 including a battery power source located within said recess of battery carrier.

3. A self-contained hearing aid in accordance with claim 2 including a sound tube, said tube being connected to said receiver and said tube being sinuously disposed within said auditory canal portion.

4. A self-contained hearing aid in accordance with claim 3 in which said receiver is mounted at an angle displaced about 90° with respect to the plane of said coverplate.

*5. A self-contained hearing aid comprising:*

*(a) a unitary housing,*

*(b) the housing having a main body portion which fits in the ear,*

*(c) an outer end of the main body portion having an opening to provide access to the interior of the housing,*

*(d) a coverplate removably attached to said body opening to totally enclose the housing,*

*(e) a battery compartment on said coverplate accessible from outside the housing,*

*(f) a microphone mounted to said coverplate,*

*(g) an amplifier circuit directly connected to said microphone, and*

*(h) a receiver connected to said amplifier circuit and to said microphone,*

*(i) said microphone, amplifier circuit, receiver and battery compartment being mounted to the coverplate so as to form an integral assembly insertable into, and removable from, the main body as a unit.*

*6. A self-contained hearing aid comprising:*

*(a) a unitary housing,*

*(b) the housing having a main body portion which fits in the ear,*

*(c) an outer end of the main body portion having an opening to provide access to the interior of the housing,*

*(d) a coverplate removably attached to said body opening to totally enclose the housing,*

*(e) a battery compartment on said coverplate accessible from outside the housing,*

*(f) a microphone mounted to said coverplate,*

*(g) a sound inlet in the coverplate communicating with the microphone,*

*(h) an amplifier circuit directly connected to said microphone,*

*(i) an amplifier volume control element connected to the amplifier,*

*(j) an access hole in the coverplate to adjust the volume control element from outside the housing, and*

*(k) a receiver connected to said amplifier circuit and to said microphone,*

*(l) said microphone, amplifier volume control element and battery compartment being mounted on, and attached directly to, the coverplate.*

*7. A hearing aid according to claim 6 including a sound tube connected to said receiver and terminating in the housing end, and a porous replaceable filter mounted in the housing end at the end of the tube to prevent clogging of the tube with ear wax or the like.*

*8. A hearing aid according to claim 6 including a sound tube connected to said receiver, said tube being sinuously disposed within an auditory canal portion of the main body portion to avoid feedback.*

*9. A self-contained hearing aid comprising:*

*(a) a unitary housing,*

(*b*) *the housing having a main body portion which fits in the ear and terminates in a housing end,*

(*c*) *an outer end of the main body portion having an opening to provide access to the interior of the housing,*

(*d*) *a coverplate removably attached to said body opening to totally enclose the housing,*

(*e*) *a battery compartment on said coverplate accessible from outside the housing,*

(*f*) *a microphone mounted to said coverplate,*

(*g*) *a sound inlet in the coverplate communicating with the microphone,*

(*h*) *an amplifier circuit directly connected to said microphone,*

(*i*) *an amplifier control element connected to the amplifier,*

(*j*) *an access hole in the coverplate to adjust the volume control element from outside the housing, and*

(*k*) *a receiver connected to said amplifier circuit and to said microphone,*

(*l*) *said microphone, amplifier circuit, amplifier volume control element, receiver and battery compartment being mounted to the coverplate so as to form an integral assembly insertable into, and removable from, the main body as a unit.*

*10. A coverplate for use in a self-contained hearing aid having a unitary housing with a main body portion which fits in the ear, the main body portion having an opening to provide access to the interior of the housing,*

(*a*) *the coverplate being removably attachable to said main body opening to totally enclose the housing,*

(*b*) *a battery compartment on said coverplate accessible from outside the housing,*

(*c*) *a microphone mounted to said coverplate,*

(*d*) *an amplifier circuit directly connected to said microphone, and*

(*e*) *a receiver connected to said amplifier circuit and to said microphone,*

(*f*) *said microphone, amplifier circuit, receiver and battery compartment being mounted to the inside of the coverplate so as to form an integral assembly insertable into, and removable from, the main body as a unit.*

*11. A coverplate for use in a self-contained hearing aid having a unitary housing with a main body portion which fits in the ear, the main body portion having an opening to provide access to the interior of the housing,*

(*a*) *the coverplate being removably attachable to said main body opening to totally enclose the housing,*

(*b*) *a battery compartment on said coverplate accessible from outside the housing,*

(*c*) *a microphone mounted to said coverplate,*

(*d*) *a sound inlet in the coverplate communicating with the microphone,*

(*e*) *an amplifier circuit directly connected to said microphone,*

(*f*) *an amplifier volume control element connected to the amplifier,*

(*g*) *an access hole in the coverplate to adjust the volume control element from outside the housing, and*

(*h*) *a receiver connected to said amplifier circuit and to said microphone,*

(*i*) *said microphone, amplifier volume control element and battery compartment being mounted on, and attached directly to the coverplate.*

*12. A coverplate for use in a self-contained hearing aid having a unitary housing with a main body portion which fits in the ear, the main body portion having an opening to provide access to the interior of the housing,*

(*a*) *the coverplate being removably attachable to said main body opening to totally enclose the housing,*

(*b*) *a battery compartment on said coverplate accessible from outside the housing,*

(*c*) *a microphone mounted to said coverplate,*

(*d*) *a sound inlet in the coverplate communicating with the microphone,*

(*e*) *an amplifier circuit directly connected to said microphone,*

(*f*) *an amplifier volume control element connected to the amplifier,*

(*g*) *an access hole in the coverplate to adjust the volume control element from outside the housing, and*

(*h*) *a receiver connected to said amplifier circuit and to said microphone,*

(*i*) *said microphone, amplifier circuit, amplifier volume control element, receiver and battery compartment being mounted to the coverplate so as to form an integral assembly insertable into, and removable from, the main body as a unit.*

References Cited by the Examiner

The following references, cited by the Examiner, are of record in the patented file of this patent or the original patent.

UNITED STATES PATENTS

| | | |
|---|---|---|
| 2,930,858 | 3/1960 | Hollingsworth. |
| 2,950,357 | 8/1960 | Mitchell. |
| 2,967,913 | 1/1961 | Aubert et al. |
| 2,987,584 | 6/1961 | Webber et al. |

KATHLEEN H. CLAFFY, *Primary Examiner.*

S. J. BOR, *Assistant Examiner.*